United States Patent [19]

Smith

[11] Patent Number: 4,870,554
[45] Date of Patent: Sep. 26, 1989

[54] ACTIVE SNUBBER FORWARD CONVERTER

[75] Inventor: Jerry J. Smith, Westbrook, Conn.

[73] Assignee: Power Systems, Inc., South Bloomfield, Conn.

[21] Appl. No.: 119,675

[22] Filed: Nov. 12, 1987

[51] Int. Cl.[4] ............................................. H02M 3/335
[52] U.S. Cl. .......................................... 363/20; 363/56; 363/131
[58] Field of Search ........................ 363/20, 21, 56, 97, 363/131

[56] References Cited

U.S. PATENT DOCUMENTS

| | | | |
|---|---|---|---|
| 4,561,046 | 12/1985 | Kuster | 363/56 X |
| 4,652,809 | 3/1987 | Barn | 363/56 X |
| 4,675,796 | 6/1987 | Gautherin et al. | 363/24 X |
| 4,760,512 | 7/1988 | Loftus | 363/56 X |

OTHER PUBLICATIONS

Shaughnessy, "Modelling and Design of Non–Dissipative LC Snubber Networks", 3/80, pps. 2-3.

Primary Examiner—Patrick R. Salce
Assistant Examiner—Kristine Peckman
Attorney, Agent, or Firm—Hayes & Reinsmith

[57] ABSTRACT

In a forward converter power supply comprising a transformer having a primary winding connected to a primary circuit and a secondary winding connected to a secondary circuit, and a switching transistor in the primary circuit, an active network snubber in the primary circuit for receiving and storing continuing current from the transformer primary winding upon switching of the transistor and for returning current through the transformer primary winding so as to resent the transformer and thereby returning parasitic energy in the transformer caused by leakage inductance and magnetizing current to the energy source. The snubber comprises a capacitor for receiving and storing continuing current from said primary winding upon switching of the transistor, a diode for providing a path for flow of the continuing current from the primary winding to the capacitor and an electronic switch operatively connected to the capacitor to the primary winding and to the switching transistor for returning current from the capacitor to the primary winding upon further switching of the transistor. The capacitor is connected so that the voltage thereon automatically adjusts to reset the transformer upon the further switching of the transistor. The electronic switch and the switching transistor are operatively connected in a manner so as to be always in opposite conducting states.

16 Claims, 2 Drawing Sheets

ACTIVE SNUBBER FORWARD CONVERTER

BACKGROUND OF THE INVENTION

This invention relates to the art of d.c. switching power supplies, and more particularly to a transistor forward converter switching power supply having improved means for returning parasitic energy in the power transformer caused by leakage inductance and magnetizing current to the energy source.

A single transistor forward converter switching power supply includes a transformer which provides a regulated d.c. output voltage in the secondary winding circuit and a transistor switch in the primary winding circuit to which circuit is applied an input d.c. voltage. In such a power supply there must be provided a means to dissipate parasitic energy in the power transformer caused by leakage inductance and magnetizing current. The most common method for doing this has been to provide an additional winding, typically called a dump winding, in the transformer primary. The dump winding, however, limits the B-H excursions of the transformer magnetic core which requires a somewhat larger transformer than if the full capabilities of the core were used. Furthermore, the transformer primary winding and the dump winding must be tightly coupled for good operation and to prevent large voltage spikes in the primary circuit, such tight coupling usually meaning that both windings have the same number of turns. However, when the number of turns on these windings is the same, a practical limitation of below fifty percent is imposed on the duty cycle of the transistor switch in the primary circuit to prevent transistor failure due to transformer saturation. This limitation on the duty cycle, in turn, requires a relatively large number of turns in the transformer secondary winding to maintain a regulated d.c. output with the undesirable results that the transistor switch must handle large currents and rectifiers in the secondary circuit must handle large voltages. In addition, the transistor switch must have a relatively high voltage rating to accommodate voltage spikes which can be additive with respect to input swings in the primary circuit due to coupling requirements between the primary winding and the dump winding.

SUMMARY OF THE INVENTION

It is, therefore, a primary object of this invention to provide a transistor forward converter switching power supply having improved means for returning parasitic energy in the power transformer to the energy source.

It is a further object of this invention to provide such a power supply wherein parasitic energy is returned in a manner which increases use of the transformer core capabilities thereby allowing the transformer to be smaller in size.

It is a further object of the present invention to provide such a power supply wherein parasitic energy is returned in a manner which does not impose undue limitations on the duty cycle of the transistor switch in the primary circuit thereof.

It is a more particular object of this invention to provide such a power supply wherein parasitic energy is returned in a manner allowing lower voltages and currents in the transistor switch in the primary circuit and allowing lower voltage across rectifiers in the secondary circuit.

The present invention provides, in a forward converter power supply including an electronic switch or transistor in the power transformer primary circuit, an active network snubber in the primary circuit for resetting the transformer immediately upon switching of the transistor so as to return parasitic energy in the power transformer caused by leakage inductance and magnetizing current to the energy source. Upon switching of the transistor, the active network snubber receives and stores continuing current from the transformer primary and then returns the current through the transformer primary to reset the transformer. The snubber comprises an electronic switch in the form of a transistor, energy storage means in the form of a capacitor and means in the form of a diode for providing a path for flow of the continuing current to the energy storage means. The snubber transistor and the switching transistor are operatively connected so as to be always in opposite conducting states, the diode connects the transformer primary winding to the capacitor for charging the same, and the snubber transistor connects the capacitor to the primary winding for returning current therethrough. The capacitor voltage automatically adjusts to reset the transformer at the instant the switching transistor switches again. The active network snubber advantageously increases use of the transformer core capabilities thereby allowing the transformer to be smaller in size, does not impose undue limitations on the duty cycle of the transistor switch in the primary circuit and allows lower voltages and currents in the transistor switch in the primary circuit and lower voltages across devices in the secondary circuit.

The foregoing and additional advantages and characterizing features will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
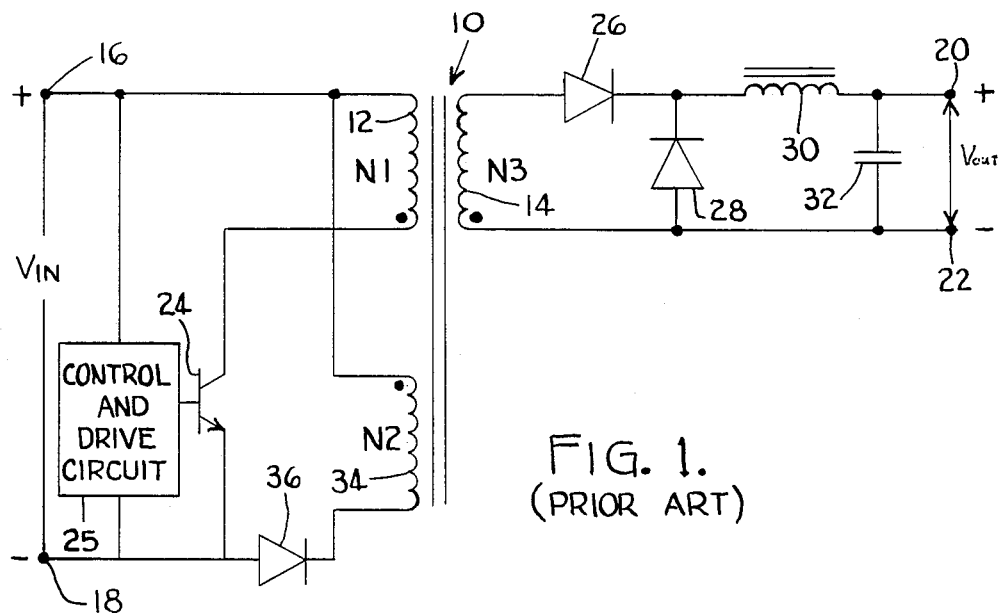
FIG. 1 is a schematic circuit diagram of a prior art single transistor forward converter switching power supply including a dump winding in the transformer primary to dissipate parasitic energy.

A single transistor forward converter switching power supply is shown in FIG. 1 and includes a power transformer 10 having primary and secondary windings 12 and 14, respectively. The transformer primary circuit includes a pair of input terminals 16,18 to which an input d.c. voltage Vin is applied, and the transformer secondary circuit includes a pair of output terminals 20,22 on which an output d.c. voltage Vout is provided. Vin typically is derived from the output of a rectifier, the input of which is connected to the line a.c. voltage. In particular, input terminal 16 is connected to one terminal of primary winding 12 and the other terminal of winding 12 is connected through an electronic switch or transistor 24 to input terminal 18. In the circuit shown, positive polarity input voltage is applied to terminal 16, connected to one end of primary winding 12, the opposite end of winding 12 is connected to the collector of transistor 24, and the emitter of transistor 24 is connected to the negative voltage input terminal 18. Transistor 24 is a bipolar transistor, the control or base terminal of which is connected to a control and drive circuit 25 for switching the same at a controlled rate. Such control circuits are conventional and well known to those skilled in the art so that a detailed description is believed to be unnecessary.

The transformer secondary winding 14 is connected to a rectifier pair comprising diodes 26,28 and the rectifier output is coupled through a filter comprising an inductor or choke 30 and capacitor 32 to output terminals 20,22. In particular, one terminal of secondary winding 14 is connected to the anode of diode 26 and the other terminal of winding 14 is connected to the anode of diode 28 and to the negative output voltage terminal 22. The cathodes of diodes 26,28 are connected together and to one terminal of choke coil 30, the other terminal of which is connected to the positive output voltage terminal 20. Capacitor 32 is connected across terminals 20,22.

In the power supply of FIG. 1 a means must be provided to dissipate parasitic energy in the power transformer 10 caused by leakage inductance and magnetizing current. The most common way of doing this is to provide another winding 34, called a dump winding, in the transformer primary. One terminal of winding 34 is connected to the positive voltage input terminal 16. The other terminal of winding 34 is connected through a diode 36 to the negative input voltage terminal 18 and to transistor 24. In particular, winding 34 is connected to the cathode of diode 36, and the anode of diode 36 is connected to terminal 18 and to emitter of transistor 24.

The power supply of FIG. 1 operates in the following manner. During normal operation, transistor 24 turns on and off at a frequency of 20,000 Hertz or higher. The percentage of on time, duty cycle, is controlled to keep the DC output voltage constant with the smallest duty cycle occuring at the maximum DC input voltage and the larger duty cycle occurring at the minimum DC input voltage.

Each time transistor 24 turns off, current continues to flow in the primary circuit for some period of time because of energy stored in the leakage inductance between windings 12 and 14 and also because of the magnetizing current which has built up in winding 12 during the on time of transistor 24. As the voltage across winding 12 reverses, the collector voltage of transistor 24 rises above the DC input voltage, and in an attempt to keep the current flowing, a voltage is induced in dump winding 34 which forward biases diode 36 and the current that wants to continue flowing in winding 12 is suddenly transferred to winding 34 and is dumped back into the DC input bus. Current continues to flow until the magnetizing current drops to zero which means that the core of the transformer is reset to the origin of its B-H curve. When the magnetizing current reaches zero, the voltages on transformer 10 collapse and the voltage on the collector of transistor 24 drops to the DC input voltage.

For good operation windings 12 and 34 must be very tightly coupled, thus they are usually the same number of turns and wound on top of each other in the transformer. The voltages for this condition are shown in the waveform 40 of FIG. 2 which is the collector-emitter voltage across transistor 24. Also, for the transformer to be properly reset, the volt-second area #1 and the volt-second area #2 in the waveform of FIG. 2 must be equal.

Figure 3:
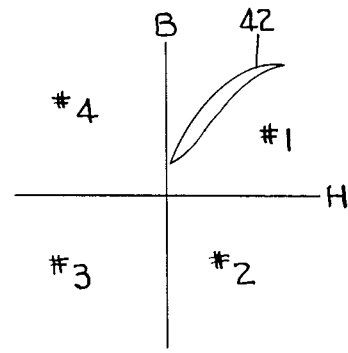
FIG. 3 is a graph including a B-H plot illustrating operation of the transformer in the circuit of FIG. 1.

Although winding 34 in the power supply of FIG. 1 serves to dissipate parasitic energy in the transformer 10, it imposes a number of disadvantages. One is that the B-H excursions of the magnetic core of transformer 10 are limited to the first quadrant as illustrated by B-H curve 42 in FIG. 3 which means that the transformer is somewhat larger than if the full capabilities of the core were used. Another is that windings 12 and 34 must be very tightly coupled to prevent large voltage spikes from appearing across transistor 24 at turn-off, causing transistor failure. The coupling of these windings is further complicated because of the large voltages between the start end of winding 12 and the finish end of winding 34.

A further disadvantage arises from the fact that when the turns on windings 12 and 34 are the same, the theoretical maximum duty cycle is 50%. If transistor 24 is on more than 50% of the time, area 2 of the waveform in FIG. 2 will be less than area 1 and transformer 10 will saturate, causing catastrophic failure of transistor 24. To prevent this, the maximum duty cycle of transistor 24 must be electronically set to 40-45% to insure that 50% will not be exceeded under any normal or abnormal conditions. Since the practical limitation of 40-45% duty cycle exists in the forward converter of FIG. 1, there is the added disadvantage that a relatively large number of turns are required for winding 14 to maintain a regulated output voltage even at the lower input of 200 volts d.c. This means that the current switched by transistor 24 is large, Ioutput (N3/N1), and that the voltage across output rectifiers 26 and 28 is also high, VDCinput (N3/N1) wherein N1 and N3 are the number of turns in primary winding 12 and secondary winding 14, respectively.

Figure 2:
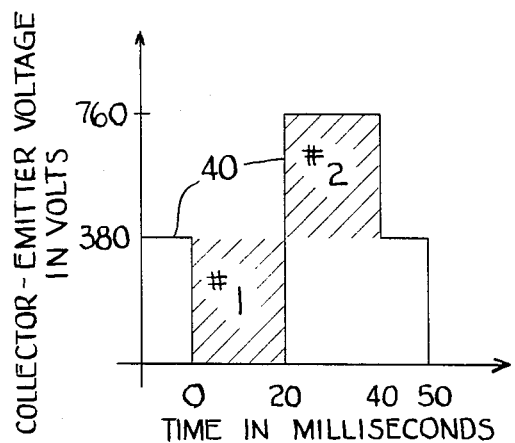
FIG. 2 is a graph including waveforms illustrating operation of the transistor switch in the circuit of FIG. 1.

As shown in FIG. 2, under ideal conditions the voltage across transistor 24 is twice the DC input voltage, nearly 800 volts for an off line power supply. A voltage spike that increases with output current will add to this due to coupling limitations between windings 12 and 34. Thus another disadvantage is that transistor 24 must have a rating of 1000 volts or greater.

Figure 4:
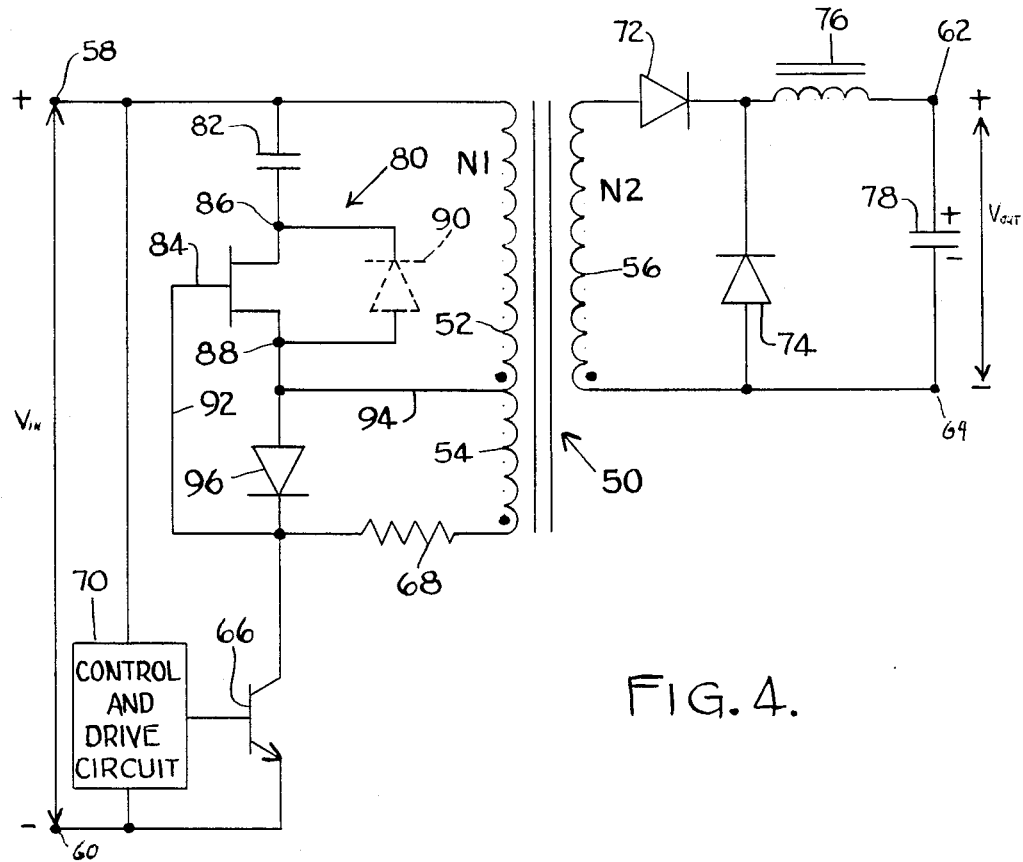
FIG. 4 is a schematic circuit diagram of a transistor forward converter switching power supply including an active network snubber according to the present invention provided in the transformer primary circuit to return parasitic energy.

A transistor forward converter switching power supply having improved means for returning parasitic energy in the power transformer to the energy source is shown in FIG. 4. A power transformer 50 has first and second primary winding sections 52 and 54, respectively and a secondary winding 56 inductively coupled to the primary section 52. Primary winding section 52 has N1 turns, secondary winding 56 has N2 turns and primary section 54 has N3 turns. The transformer primary circuit includes a pair of input terminals 58,60 to which an input d.c. voltage $V_{IN}$ is applied, and the transformer secondary circuit includes a pair of output terminals 62,64 on which an output d.c. voltage $V_{OUT}$ is provided. $V_{IN}$ typically is derived from the output of a rectifier (not shown), the input of which is connected to an energy source in the form of the a.c. line voltage. In particular, input terminal 58 is connected to one terminal of the transformer primary winding and the other terminal of the transformer primary is connected through an electronic switch or transistor 66 to input terminal 60. In the circuit shown, positive polarity input voltage is applied to terminal 58 connected to the end of primary winding section 52, and the end of primary winding section 54 is connected through a resistor 68 to the collector of transistor 66, the emitter of which is connected to the negative voltage input terminal 60. Transistor 66 is a bipolar transistor, the control or base terminal of which is connected to a control and drive circuit 70 for switching the same at a controlled rate. Such control circuits are well-known to those skilled in the art so that a detailed description thereof is believed to be unnecessary.

The transformer secondary winding 56 is connected to a rectifier pair comprising diodes 72,74 and the rectifier output is coupled through a filter comprising an inductor or choke 76 and capacitor 78 to output terminals 62,64. In particular, one terminal of secondary winding 56 is connected to the anode of diode 72 and the other terminal of winding 56 is connected to the anode of diode 74 and to the negative output voltage terminal 64. The cathodes of diodes 72,74 are connected together and to one terminal of choke coil 76, the other terminal of which is connected to the positive output voltage terminal 62. Capacitor 78 is connected across terminals 62,64.

The power supply of FIG. 4 also includes means for returning parasitic energy in power transformer 50 caused by leakage inductance and magnetizing current to the energy source. In accordance with the present invention, this is in the form of an active network snubber in the primary circuit for resetting the transformer immediately upon switching of transistor 66. The snubber of the present invention comprises an active circuit element in the form of an electronic switch or transistor 80 and energy storage means in the form of capacitor 82. The active device 80 and energy storage means 82 are connected together, the combination is connected across the transformer primary winding 52, and device 80 is operatively connected to transistor 66 in a manner such that whenever transistor 66 is off device 80 is on and vice-versa.

In the illustrative circuit of FIG. 4, device 80 is a power MOS transistor having gate, drain and source terminals 84,86 and 88 respectively. The drain to source diode inherent in such transistors is designated 90. Drain terminal 86 is connected to one terminal of capacitor 82, the other terminal of which is connected to the positive voltage input terminal 58. Gate terminal 84 of transistor 80 is connected by lead 92 to the collector of transistor 66. Source terminal 88 of transistor 80 is connected by lead 94 to the junction of primary winding sections 52 and 54. Source terminal 88 also is connected to the anode of a diode 96, the cathode of which is connected to the collector of transistor 66.

The circuit of FIG. 4 operates in the following manner. Transistor 80 is on whenever transistor 66 is off, and transistor 66 switches the output current times the transformer turns ratio: $I_{out} N2_{N1}$. Transistor 80 only switches the magnetizing current of transformer 50 plus any energy associated with the leakage inductance of transformer 50. Thus its current is quite small, typically 100 milliamperes.

In the circuit of FIG. 4, transistor 66 switches on and off at 20 KHz or higher. The duty cycle is controlled to keep the d.c. output voltage constant with the smallest duty cycle occuring at the maximum d.c. input voltage and the largest duty cycle occurring at the minimum d.c. input voltage.

Each time transistor 66 turns off, current continues to flow in the primary of transformer 50 for some period of time because of energy stored in the leakage inductance between windings 52 and 56 and also because of the magnetizing current which has built up in winding 52 during the on time of transistor 50. This continuing current causes the voltage across winding 52 to reverse and the current continues to flow through diode 90, the drain to source diode inherent in power MOS transistor 80, and into capacitor 82 causing the voltage on capacitor 82 to increase slightly. At the same time the reverse voltage on winding 52 induces a voltage across winding 54 which supplies gate voltage to transistor 80 turning it on. The current through inherent diode 90 drops to zero and then begins to flow the opposite way through transistor 80 which is now in the on condition. This current flows back into the primary winding causing transformer 50 to reset back into the third quadrant of its B-H curve as illustrated by curve 102 in FIG. 6 and also returns the energy previously stored in capacitor 82 to the VDC input bus in a non-dissipative manner.

When transistor 66 turns back on current begins flowing through diode 96 which immediately forces the gate of transistor 80 negative with respect to the source thereby turning transistor 80 off.

The voltage on capacitor 82 automatically adjusts itself such that transformer 50 is reset at the instant that transistor 66 turns back on resulting in a rectangular voltage waveform, no steps, across transistor 66. This is illustrated by the waveform 100 in FIG. 5 which the collector-emitter voltage across transistor 66 for 30% duty cycle. This means that the voltage across transistor 66 is the theoretical minimum attainable for a given d.c. input voltage and duty cycle. Thus, lower voltage devices can be used for transistor 66, resulting in higher performance and lower cost.

By way of further explanation of how the voltage on capacitor 82 automatically adjusts itself to exactly achieve reset of transformer 50, consider that the voltage is initially too high. Thus the volt-seconds or area 2 of the waveform 100 in FIG. 5 will equal area 1 slightly before transistor 66 is due to turn back on. Transistor 80 will remain on longer than required for reset, drawing additional current from capacitor 82, causing its voltage to reduce. On the other hand, if the voltage on capacitor 82 is not high enough to reset transformer 50, then the current dumped into capacitor 82 via diode 90 will exceed the current taken out of capacitor 82 via transistor 80 and the voltage across capacitor 82 will increase.

Figure 5:
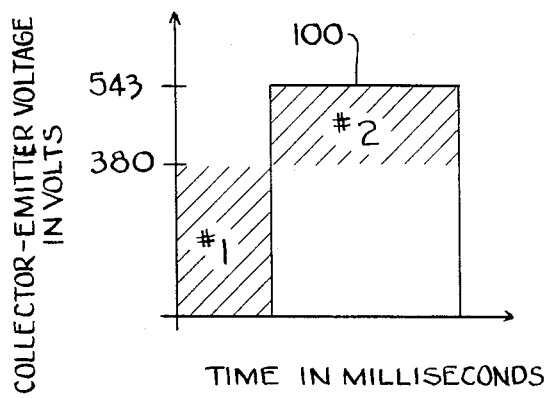
FIG. 5 is a graph including waveforms illustrating operation of the transistor switch in the circuit of FIG. 4.

The active snubber of the present invention provides a number of advantages. It resets the core of transformer 50 into the third quadrant of its B-H curve thereby allowing double the flux excursion without saturation and consequently a smaller size transformer. The active snubber also avoids the need for the dump winding in the circuit of FIG. 1 thereby eliminating all of the design and construction restraints associated with a dump winding. By eliminating the dump winding, the active snubber does not have an inherent duty cycle limitation and will not cause saturation of transformer 50 and transistor 66 under normal or abnormal conditions. With the active snubber of the present invention duty cycles up to about 65% are easily attainable. This allows the turns ratio from secondary to primary, (N2/N1), to be considerably smaller than that of the transformer in the circuit of FIG. 1. This reduced turns ratio means the current of transistor 66 is greatly reduced for a given power level: I=Ioutput (N2/N1), the voltage across diode 72 is greatly reduced: V=Vc1 N2/N1), and the voltage across diode 74 is also greatly reduced: V=Vinput (N2/N1). For example this means that the turns on secondary winding 56 can be reduced by about ⅓. Therefore the current that transistor 66 must switch is reduced ⅓, or a given transistor can be used at output currents ⅓ higher, and the voltages across diodes 72 and 74 are similarly reduced, allowing low drop Schottky rectifiers to be used on 12 and 15 volt outputs instead of just 5 volt for improved efficiency and power density. A further advantage is that with the active snubber of the present invention the voltage across transistor 66 is rectangular rather than stepped and thus is the theoretical minimum that can possibly exist for a given VDC input and duty cycle. Any additional voltage spike is caused by the switching current of transistor 66 passing through the ESR of the snubber capacitor 82 and is only a few volts. The maximum voltage across transistor 66 is about 543 volts for a d.c. input of 200–380 VDC as shown in FIG. 5. Thus lower voltage higher performance transistors can be used for transistor 66 or economical 600 volt power FET's can be used for high frequency designs, 100 KHz and higher.

To summarize, the advantages of the active snubber of the present invention include lower voltages and currents in transistor 66, lower voltages across diodes 72 and 74, smaller transformer since the B-H curve includes the third quadrant, and duty cycles above 50% do not cause catastrophic failures. Transformer construction is simplified by eliminating the need for a dump winding and very tight coupling. Currently available components enable operation at much higher power levels and efficiencies compared with the circuit of FIG. 1. The active snubber enables improved performance when magnetic amplifier circuitry is used to regulate the voltage of additional outputs.

The power supply including the active snubber of the present invention finds use in a variety of applications, both as general purpose power supply use and specific uses such as in computer accessory power supplies.

By way of example, in an illustrative circuit, transformer 50 is a Ferroxcube 783E608-3C6A transformer having 65 turns, 3 turns and 4 turns on windings 52,54 and 56, respectively, transistor 66 is Motorola MJ16006, resistor 68 has a magnitude of 220 ohms, rectifier diodes 72,74 both are Motorola SD41, inductor 76 has a magnitude of 25 microhenries, capacitor 78 has a magnitude of 10,000 microfarads rated at 6.3 volts, transistor 80 is a Siemens BUZ 78 power MOS transistor and diode 96 is General Instrument SB530. In this exemplary circuit, for a d.c. range of 200–380 volts on terminals 58,60 the output voltage on terminals 62,64 is 5 volts and the current in the secondary circuit is 40 amperes.

Figure 6:
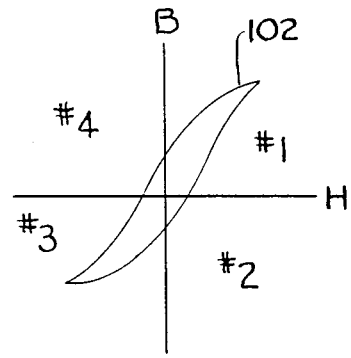
FIG. 6 is a graph including a B-H plot illustrating operation of the transformer in the circuit of FIG. 4.

As an alternative, in the circuit of FIG. 4, the combination of a bipolar transistor and diode can be substituted for power MOS transistor 80. In particular, the emitter of the bipolar transistor would be connected to the collector of transistor 66 and to the anode of the diode. The collector of the bipolar transistor would be connected to the capacitor and to the cathode of the diode. There would be a single transformer primary winding with one end connected to the capacitor and the other end connected to the collector of transistor 66, the emitter of the bipolar transmitter and the anode of the diode. When one transistor is on, the other is off and vice-versa. Each time transistor 66 turns off, current continues to flow in the transformer primary for some period of time because of energy stored in the leakage inductance between the primary and secondary windings and also because of the magnetizing current which has built up in the primary winding during the on time of transistor 66. This continuing current causes the voltage across the primary winding to reverse and the current flows through the diode and into capacitor 82 causing the voltage on capacitor 82 to increase slightly. The current through the diode falls to zero and current then begins to flow through the bipolar transistor, which has been turned on since transistor 66 turned off, and back into the transistor primary of causing the transformer to reset back into the third quadrant of its B-H curve as shown in FIG. 6. The voltage on capacitor 82 automatically adjusts itself as described hereinabove.

It is therefore apparent that the present invention accomplishes its intended objects. There is provided a transistor forward converter switching power supply having improved means for returning parasitic energy in the power transformer which increases use of the transformer core capabilities thereby allowing the transformer to be smaller in size, which does not impose undue limitations on the duty cycle of the transistor switch in the primary circuit, and which allows lower voltages and currents in the transistor switch in the primary circuit and lower voltages across rectifiers in the secondary circuit.

While an embodiment of the present invention has been described in detail, that is for the purpose of illustration, not limitation.

I claim:

1. A forward converter power supply comprising:
   (a) a transformer having a primary winding connected to a primary circuit including a pair of input terminals adapted for connection to an energy source and a secondary winding connected to a secondary circuit including a pair of output terminals;
   (b) a switching transistor in said primary circuit; and
   (c) an active network snubber in said primary circuit for resetting said transformer upon switching of said transistor so as to return parasitic energy in said transformer caused by leakage inductance and magnetizing current to the energy source through the primary winding.

2. A power supply according to claim 1, wherein said active network snubber comprises:
   (a) means for receiving and storing continuing current from said transformer primary winding upon switching of said transistor; and
   (b) electronic switch means for returning current to said transformer primary winding upon further switching of said transistor.

3. A power supply according to claim 1, wherein said active network snubber comprises:
   (a) energy storage means for receiving and storing continuing current from said primary winding upon switching of said transistor;
   (b) means for providing a path for flow of said continuing current from said primary winding to said energy storage means; and
   (c) an electronic switch operatively connected to said energy storage means to said primary winding and to said switching transistor for returning current from said energy storage means to said primary winding upon further switching of said transistor.

4. A power supply according to claim 3, wherein said electronic switch and said switching transistor are operatively connected in a manner so as to be always in opposite conducting states.

5. A power supply according to claim 3, wherein said energy storage means comprises a capacitor, said electronic switch comprises a transistor and said path providing means comprises a diode connected between said primary winding and said capacitor and across said electronic switch.

6. A power supply according to claim 3, wherein said energy storage means comprises a capacitor connected so that the energy thereon from connection of the input terminals to said energy source automatically adjusts to reset said transformer upon said further switching of said transistor.

7. A power supply according to claim 1, wherein said active network snubber is connected to said switching transistor and across said transformer primary winding.

8. A forward converter power supply comprising:
(a) a transformer having a primary winding connected to a primary circuit including a pair of input terminals adapted for connection to an energy source and a secondary winding connected to a secondary circuit including a pair of output terminals;
(b) a switching transistor in said primary circuit; and
(c) an active network snubber in said primary circuit for receiving and storing continuing current from said transformer primary winding upon switching of said transistor and for returning current through said transformer primary winding so as to reset said transformer upon further switching of said transistor thereby returning parasitic energy in said transformer caused by leakage inductance and magnetizing current to the energy source.

9. A power supply according to claim 8, wherein said active network snubber comprises:
(a) energy storage means for receiving and storing continuing current from said primary winding upon switching of said transistor;
(b) means for providing a path for flow of said continuing current from said primary winding to said energy storage means; and
(c) an electronic switch operatively connected to said energy storage means to said primary winding and to said switching transistor for returning current from said energy storage means to said primary winding upon further switching of said transistor.

10. A power supply according to claim 9, wherein said electronic switch and said switching transistor are operatively connected in a manner so as to be always in opposite conducting states.

11. A power supply according to claim 9, wherein said energy storage means comprises a capacitor, said electronic switch comprises a transistor and said path providing means comprises a diode connected between said primary winding and said capacitor and across said electronic switch.

12. A power supply according to claim 8, wherein said active network snubber is connected to said switching transistor and across said transformer primary winding.

13. A power supply according to claim 9, wherein said energy storage means comprises a capacitor connected so that the energy thereon from connection of the input terminals to said energy source automatically adjusts to reset said transformer upon said further switching of said transistor.

14. An active network snubber for use in a forward converter power supply including a transformer connected to an energy source and having primary and secondary windings and a switching transistor operatively connected to said primary winding, said snubber adapted for connection across said primary winding and to said switching transistor and comprising:
(a) an electronic switch having a current flow path therethrough;
(b) a capacitor connected to the current flow path of said electronic switch; and
(c) diode means connected to said capacitor and across said electronic switch;
(d) so that upon switching of said transistor continuing current from said primary winding flows through said diode means to said capacitor for charging same and thereafter said electronic switch returns current to said primary winding to reset said transformer when said transistor switches again thereby returning parasitic energy in said transformer caused by leakage inductance and magnetizing current to the energy source.

15. An active network snubber according to claim 14, wherein said electronic switch and said switching transistor are adapted for operative connection in a manner so as to be always in opposite conducting states.

16. An active network snubber according to claim 14, wherein said capacitor is connected so that the energy thereon from connection of the input terminals to said energy source automatically adjusts to reset said transformer upon said further switching of said transistor.

* * * * *